United States Patent [19]

Molinar et al.

[11] Patent Number: 4,967,384
[45] Date of Patent: Oct. 30, 1990

[54] HIGHLY ACCURATE WEIGHING SYSTEM

[75] Inventors: Tommy B. Molinar, Ft. Worth; Jerome E. Johnston, Austin, both of Tex.

[73] Assignee: General Electrodynamics Corporation, Arlington, Tex.

[21] Appl. No.: 167,528

[22] Filed: Mar. 14, 1988

[51] Int. Cl.⁵ .................... G01G 21/00; G01G 23/01
[52] U.S. Cl. .................... 364/567; 364/466; 340/870.06; 177/25.13; 177/25.12; 73/1 B
[58] Field of Search ............ 364/567, 466, 571.05; 73/1 B; 340/870.3, 870.04, 870.06, 870.05; 177/25.11, 25.12, 25.13, 25.14, 185, 136, 25.18

[56] References Cited

U.S. PATENT DOCUMENTS

| | | | |
|---|---|---|---|
| 4,039,036 | 8/1977 | Baumgartner et al. | 177/185 |
| 4,143,724 | 3/1979 | Itani | 364/567 |
| 4,330,837 | 5/1982 | Itani | 177/25.13 |
| 4,502,555 | 3/1985 | Gower | 177/25.14 |
| 4,531,600 | 7/1985 | Langlais et al. | 177/185 |
| 4,535,857 | 8/1985 | Haze | 364/571.05 |
| 4,804,052 | 2/1989 | Griffen | 177/50 |

OTHER PUBLICATIONS

Metrox, Inc., Weight and Center of Gravity Systems.
Ormond, Inc., Aircraft Weighing Systems.
Revere Corporation of America, Aircraft Weighing Kits.

Primary Examiner—Parshotam S. Lall
Assistant Examiner—V. Trans
Attorney, Agent, or Firm—Baker & Botts

[57] ABSTRACT

A microprocessor-based system (18) for weighing large objects, such as aircraft, at a number of points is disclosed. A plurality of load sensing units (10) each contain a strain gauges (50), analog amplification and calibration circuits (54), filtering circuits (56, 58), and analog-to-digital conversion circuitry (60). Each of the load sensing units (10) couple through serial data communication channels (14) to a controller (12), which contains a microprocessor (20), a keyboard (46), and a display (36). A microprocessor (20) executes a program which monitors all load sensing units (10), calculates weight based on data obtained from the load sensing units (10) and several compensation factors, and displays weight of a selected load sensing unit (10). Various foreground (200) and keyboard service (300) software routines are discussed.

3 Claims, 5 Drawing Sheets

HIGHLY ACCURATE WEIGHING SYSTEM

TECHNICAL FIELD OF THE INVENTION

The present invention generally relates to weight measurement systems. More specifically, the present invention relates to such systems which weigh heavy objects, such as aircraft.

BACKGROUND OF THE INVENTION

Aircraft and other large objects must occasionally be weighed. The weighing procedure typically utilizes a plurality of load cells upon which the entire weight of an object collectively rests. The load cells couple to transducers which provide electrical signals. These electrical signals may be measured, and the electrical measurements may be converted into a weight. The sum of weights resulting from outputs measured at each of the plurality of load cells equals the total weight of the object. In addition, the individual weights are useful in calculating center of gravity parameters.

Conventional systems particularly designed to weigh large objects, such as aircraft, are known to those skilled in the art. Such conventional systems suitably perform this task so long as system accuracy need not be high, so long as skilled personnel conduct the measurements, and so long as down-time of the weighing system does not lead to excessive inconvenience. However, in the aircraft related industries and other industries, safety and cost cutting efforts dictate the performance of highly accurate weight measurements upon demand and without delay. Moreover, lesser skilled personnel than may have been available for such measurements in the past must now successfully perform such measurements.

Conventional weighing systems fail to provide adequate solutions for these needs. Conventional electric circuits which measure transducer outputs have typically been so influenced by noise, the environment, or other factors that they fail to achieve acceptable accuracies. Moreover, prior art weighing systems require complicated initializing procedures before an accurate measurement results. Only highly skilled personnel can reliably perform such procedures without error. In addition, post-measurement calculations or conversion procedures provide another source of potential errors. Furthermore, the failure of a single component in a conventional system often causes the entire system to require factory repair and recalibration. Consequently, users of such a conventional system face the expensive prospect of purchasing an entire substitute system for use only as a backup or the inconvenient prospect of tolerating extensive down-times. In either situation the transportation costs associated with sending an entire system to a factory for repair and recalibration are excessive.

Thus, a need exists for an improved weighing system which produces highly accurate measurements, which can be successfully operated by lesser skilled personnel, and which minimizes the expense of maintaining the system in an operable condition.

SUMMARY OF THE INVENTION

Accordingly, it is an object of the present invention to provide an improved architecture for electrical circuits in a weighing system so that the architecture produces highly accurate and repeatable measurements of a load cell's output signal.

Another object of the present invention concerns providing an improved portable weighing system.

Yet another object of the present invention concerns automating complicated or error prone tasks in the weighing process without significantly adding to system expense.

Still another object of the present invention concerns providing an improvement in the flexibility of weighing systems by permitting a weighing system to operate with a variety of different load cells.

Yet another object of the present invention concerns providing an improvement in the reliability of weighing systems by incorporating a significant amount of redundancy in the system without incurring the expense of an entire additional system.

The above and other objects and advantages of the present invention are carried out in one form by a weighing system which includes a plurality of load sensing units and a single controller. Each of the load sensing units includes a load cell, circuitry for calibrating the load cell, and a converter for converting load cell output signals into digital data values. The load cell is configured so that it tolerates loads within only one of a plurality of load ranges. The calibration circuitry allows each of the plurality of load sensing units to be individually calibrated and to operate independently from the other ones of the load sensing units. The controller is remotely located from each of the load sensing units. It electrically couples to the converter within each of the load sensing units. The controller receives data values which indicate the load range for the load cells within each of the load sensing units. Moreover, the controller includes a display for displaying weight values experienced by any one of the load sensing units. These weight values are calculated using the load range data values and the digital data values from the converter.

BRIEF DESCRIPTION OF THE DRAWINGS

A more complete understanding of the present invention may be derived by referring to the detailed description and claims when considered in connection with the figures, wherein like reference numbers refer to similar items, and:

DETAILED DESCRIPTION OF THE PREFERRED EMBODIMENT

Figure 1:
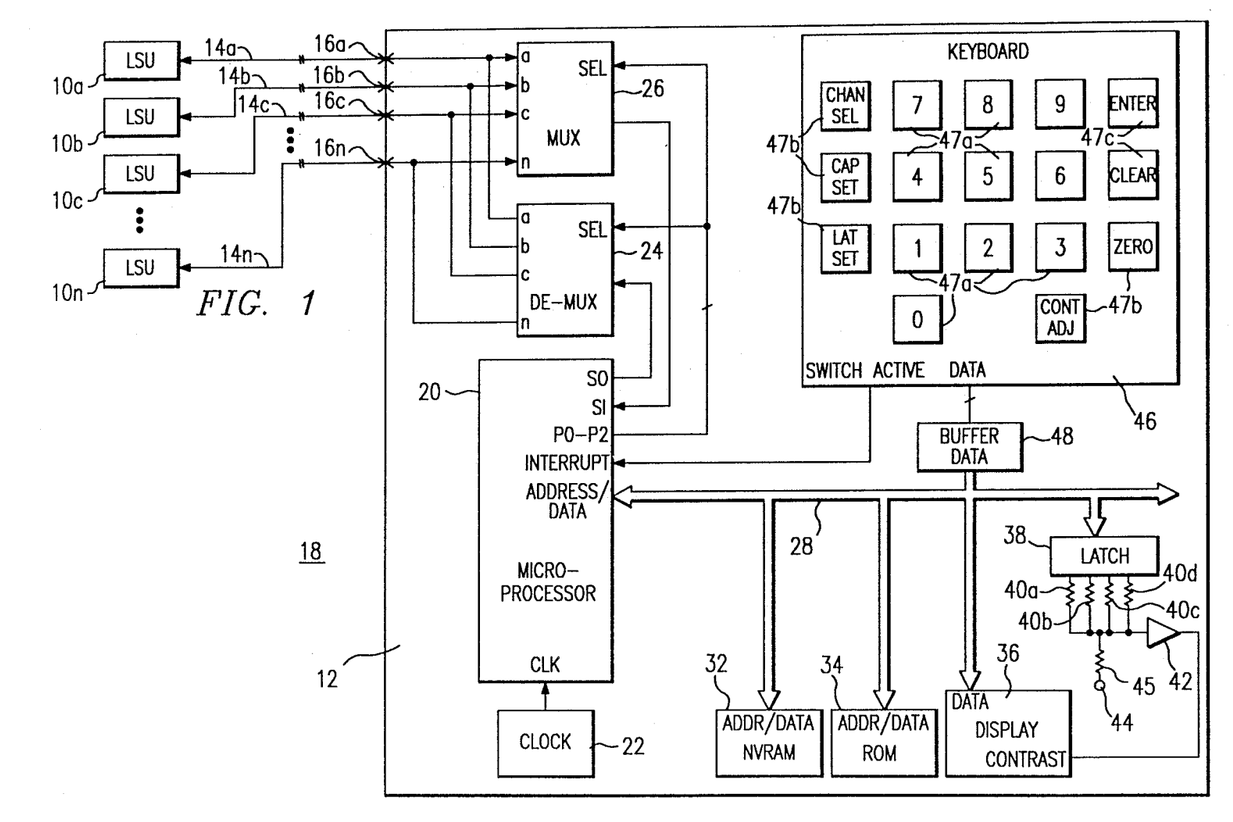
FIG. 1 shows a schematic block diagram of a preferred embodiment of the present invention.

FIG. 1 shows a simplified schematic block diagram of a weighing system 18 constructed according to a preferred embodiment of the present invention. System 18 includes a plurality of load sensing units (LSUs) 10a, 10b, 10c, and 10n, a controller 12, and cables 14a, 14b, 14c, and 14n. Each of LSUs 10a-10n contain a load cell and electrical circuitry. Each of LSUs 10a-10n sense the weight of a load applied thereto. Moreover, each of LSUs 10a-10n senses loads only within a predetermined load range. For example, LSU 10a may sense loads less than 10,000 pounds, LSU 10b may sense loads less than 25,000 pounds, LSU 10c may sense loads less than 50,000 pounds and LSU 10n may sense loads less than 100,000 pounds. Alternatively, each of LSUs 10a-10n may sense loads within the same load range.

Each of LSUs 10a-10n resides in its own housing, and the LSU housings are separated from a housing which contains controller 12. Controller 12 electrically couples to each of LSUs 10a-10n via cables 14a-14n, respectively. Cables 14a-14n provide two-way serial data communication between controller 12 and each of LSUs 10a-10n. In addition, cables 14a-14n provide power to each of LSUs 10a-10n from controller 12.

Cables 14a-14n physically couple to controller 12 at connectors 16a-16n, respectively. The preferred embodiment utilizes six of connectors 16a-16n. Thus, controller 12 is capable of operating with six LSUs 10a-10n. However, typical applications use only three or four of LSUs 10a-10n with a single controller 12. The additional connectors and interface circuits associated therewith (not shown) provided on controller 12 serve a redundancy role. The interface circuits associated with these connectors typically demonstrate a low reliability. Consequently, the extra ones of such interface circuits and connectors 16a-16n on controller 12 permit weighing system 18 to remain in operation when one of such interface circuits or connectors 16a-16n experiences a failure.

Controller 12 includes a microprocessor 20. The preferred embodiment of the present invention utilizes an 80C31 microprocessor which is manufactured by the Intel Corporation and others. This microprocessor contains internal timers and internal random access memory (RAM). However, those skilled in the art will recognize that the present invention is not limited to this particular microprocessor but can easily accommodate other types of computing devices.

A clock input of microprocessor 20 couples to a clock circuit 22. Clock circuit 22 provides the timing signals required by microprocessor 20 for operation of the computing functions and the timers contained therein. In addition, microprocessor 20 has a serial data output which couples to an input of a de-multiplexer or decoder 24. Similarly, microprocessor 20 has a serial data input which couples to an output of a multiplexer 26.

Outputs a-n of de-multiplexer 24 couple to inputs a-n of multiplexer 26 and to connectors 16a-16n, respectively. Accordingly, a serial data communication link exists between microprocessor 20 and LSUs 10a-10n. Of course, the above-discussed interface circuits (not shown) reside between the inputs of multiplexer 26 and connectors 16a-16n and between the outputs of de-multiplexer 24 and connectors 16a-16n.

Output bits P0-P2 of microprocessor 20 couple to selection inputs of de-multiplexer 24 and multiplexer 26. Accordingly, microprocessor 20 selects a particular one of LSUs 10a-10n as a target to which serial data is transmitted and from which serial data is received. The selection occurs when microprocessor 20 writes a particular selection code at output bits P0-P2.

Microprocessor 20 couples to an address/data bus 28 so that it may communicate with other devices within controller 12. Thus, microprocessor 20 communicates with a nonvolatile RAM 32 and a read only memory (ROM) 34 through bus 28. Those skilled in the art will recognize that various control circuits and address decoding circuits which are not shown in FIG. 1, are additionally utilized to interface RAM 32, ROM 34 and other devices on bus 28 to microprocessor 20. However, such control and decoding circuits are of a conventional design in the preferred embodiment of the present invention and are not discussed further herein. Nonvolatile RAM 32 retains data stored therein, even though power applied to controller 12 may be removed. Although the preferred embodiment utilizes a volatile RAM with battery backup for nonvolatile RAM 32, those skilled in the art will recognize that other forms of nonvolatile RAM, such as an electrically erasable, programmable ROM (EEPROM) may perform the same function.

A programmable ROM (PROM) or an erasable PROM (EPROM) may serve as ROM 34. ROM 34 contains computer programs that microprocessor 20 executes, tables that are utilized by the programs which microprocessor 20 executes, and other data which are not changed through the operation of system 18.

Microprocessor 20 additionally communicates over bus 28 with a display 36. Display 36 has a data input which couples to bus 28. Display 36 internally latches data written thereto by microprocessor 20. In the preferred embodiment display 36 represents a liquid crystal display (LCD) which displays 16 alpha-numeric characters. A predetermined digital code, such as an ASCII code, describes each character to be displayed. After microprocessor 20 writes such codes to display 36 in a predetermined order, the corresponding characters are then observable on display 36 by a user of system 18.

Display 36 additionally incorporates a contrast input. Microprocessor 20 controls a signal applied to this contrast input. Thus, a latch 38 has an input which couples to bus 28 so that microprocessor 20 may write data into latch 38. First, second, third, and fourth output bits of latch 38 couple through resistors 40a, 40b, 40c, and 40d, respectively, to a signal input node of an amplifier circuit 42. In the preferred embodiment resistor 40b exhibits twice the resistance of resistor 40a, resistor 40c exhibits twice the resistance of resistor 40b, and resistor 40d exhibits twice the resistance of resistor 40c. The signal input node of amplifier circuit 42 additionally couples through a resistor 45 to a terminal 44 which supplies either a positive, negative, or ground voltage. An output of amplifier circuit 42 couples to the contrast input of display 36. Thus, microprocessor 20 writes four-bit data codes to latch 38 to program the voltage supplied to the contrast input of display 36.

Controller 12 additionally contains a keyboard 46. Keyboard 46 contains a plurality of keypads 47a–47c arranged in a matrix. In the preferred embodiment, keyboard 46 includes 17 of keypads 47a–47c. Ten of the 17 keypads, referred to as keypads 47a, display a numeric legend indicating the numerals 0–9. Five of the 17 keypads, referred to as keypads 47b, represent function keys in the operation of system 18. Keypads 47b indicate "Channel Select," "Capacity Set," "Latitude Set," "Contrast Adjust," and "Zero" functions to system 18. Finally, two of the 17 keypads, referred to as keypads 47c, suggest control features and are labeled "Enter" and "Clear."

Keyboard 46 has a switch active output from a logic circuit associated therewith (not shown) that couples to an interrupt input of microprocessor 20. A signal supplied at the switch active output of keyboard 46 becomes active whenever any one of keypads 47a–47c in keyboard 46 is depressed. A data output of keyboard 46 couples to an input of a buffer 48, and an output of buffer 48 couples to bus 28. Consequently, a program executed by microprocessor 20 recognizes the occurrence of an interrupt signal from keyboard 46. Upon the occurrence of this interrupt signal, microprocessor 20 reads data from keyboard 46 through buffer 48 to identify the depressed ones of keypads 47a–47c.

Noise does not greatly influence system 18 because digital communication signals are utilized between controller 12 and LSUs 10a–10n rather than analog communication signals. Moreover, system 18 utilizes a relatively simple design. This simplicity enhances system reliability and reduces the size of system 18 to accommodate a portability feature of system 18.

Figure 2:
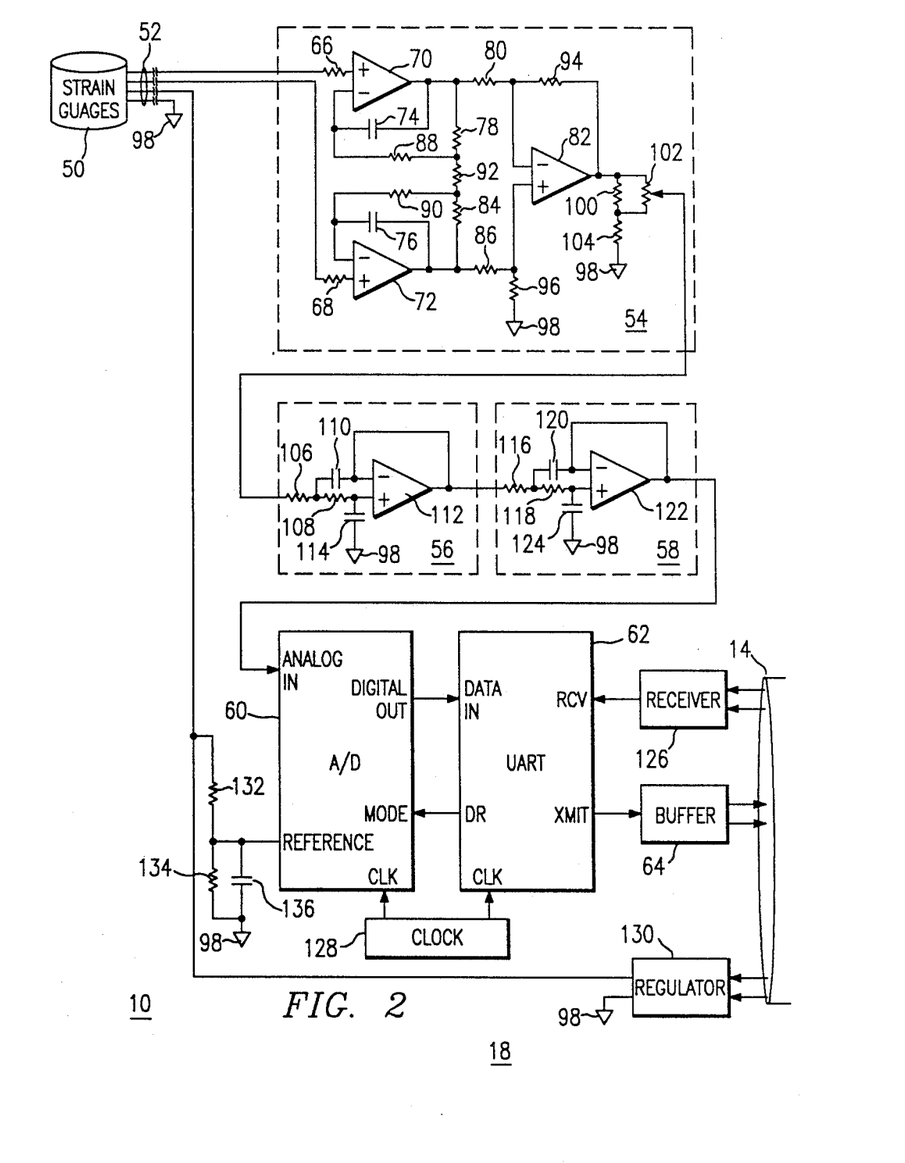
FIG. 2 shows a schematic block diagram of a load sensing unit utilized in the preferred embodiment of the present invention.

FIG. 2 shows a schematic block diagram of a single one of LSUs 10a–10n. The single one of LSUs 10a–10n shown in FIG. 2 represents any one of LSUs 10a–10n. Consequently, the LSU of FIG. 2 is referred to as LSU 10.

LSU 10 includes a load cell which contains one or more strain gauges 50. As discussed above, LSU 10 may accommodate loads in various load ranges, such as 10,000, 25,000, 50,000, and 100,000 pound ranges. Strain gauges 50 have positive and negative excitation inputs and positive and negative signal outputs. In the preferred embodiment of the present invention, the load cell is a conventional strain gauge type of load cell which is well known to those skilled in the art and is not discussed further herein.

In the preferred embodiment, the remaining portion of LSU 10 represents electrical circuitry which physically resides together with strain gauges 50 in a single housing. Consequently, this electrical circuitry resides within a few inches of strain gauges 50. Thus, a cable 52, which connects this electrical circuitry to strain gauges 50, is as short as possible and preferably less than one foot in length.

Strain gauges 50 output a load signal. The electrical circuitry manipulates the load signal in an instrumentation amplifier 54, then filters the load signal in a first filter 56 and a second filter 58. The filtered load signal output from filter 58 is then converted into digital data values in an analog-to-digital (A/D) converter 60. The digitized load signal is then supplied through a universal asynchronous receiver/transmitter (UART) 62 and a buffer 64 to cable 14. Cable 14 transports the digitized load signal to controller 12 (see FIG. 1).

Strain gauges 50 provide the load signal output therefrom to instrumentation amplifier 54 in a differential form. Amplifier 54 has a large common mode rejection ratio parameter. In the preferred embodiment, the common mode rejection ratio is greater than 102 dB. Thus, all common mode input signals to amplifier 54 are suffiently attenuated so that they have only an insignificant influence on the conversion of A/D 60. The load signal couples through resistors 66 and 68 to positive inputs of operational amplifiers (op amps) 70 and 72, respectively. An output of op amp 70 couples through a capacitor 74 to a negative input of op amp 70. Likewise, an output of op amp 72 couples through a capacitor 76 to a negative input of op amp 72. The output of op amp 70 additionallY couples to a first node of a resistor 78 and through a resistor 80 to a negative input of an op amp 82. Likewise, the output of op amp 72 additionally couples to a first node of a resistor 84 and through a resistor 86 to a positive input of op amp 82. A second node of resistor 78 couples through a resistor 88 to the negative input of op amp 70, and a second node of resistor 84 couples through a resistor 90 to the negative input of op amp 72. The second node of resistor 78 couples to the second node of resistor 84 through a resistor 92. An output of op amp 82 couples through a resistor 94 to the negative input of op amp 82, and the positive input of op amp 82 couples through a resistor 96 to a terminal 98 which is adapted to receive a common potential referred to as signal ground. The output of op amp 82 additionally couples through a resistor 100, which is coupled in parallel with a variable resistance 102, and a resistor 104, which couples in series with the parallel combination of resistor 100 and variable resistance 102, to ground 98. A tap of variable resistance 102 provides the output of instrumentation amplifier 54.

In the preferred embodiment, the resistance values in instrumentation amplifier 54 cause instrumentation amplifier 54 to exhibit a gain of around 120. However, those skilled in the art will recognize that the required gain of instrumentation amplifier 54 depends upon the output signal provided by strain gauges 50. Resistor 92 greatly influences this gain and provides a coarse adjustment for this gain. For example, resistor 92 is selected to accommodate a particular set of strain gauges 50. This gain is decreasable through the operation of a fine adjustment provided by variable resistance 102. Moreover, capacitors 74 and 76 in connection with the resistances within instrumentation amplifier 54 cause amplifier 54 to exhibit a frequency response having a single pole at around 13 Hz. Consequently, frequencies above 13 Hz are attenuated at a rate of approximately six dB per octave relative to frequencies below 13 Hz.

Variable resistance 102 is adjusted to calibrate LSU 10. In the preferred embodiment, variable resistance 102 is adjusted until the output from instrumentation amplifier 54 exhibits a predetermined number of counts for a particular predetermined load applied at LSU 10. For example when a 50,000 lb load is applied to a 50,000 lb LSU 10, variable resistance 102 is adjusted so that an analog signal output from instrumentation amplifier 54, when routed through filters 56 and 58 to A/D converter 60, is converted into a digital data value equivalent to 50,000 counts. This represents one pound per count. However, when a 25,000 lb load is applied to a 25,000 lb LSU 10, variable resistance 102 is adjusted so that a 50,000 count output again results to produce ½ pound per count. In addition, when a 100,000 lb load is applied to a 100,000 lb LSU 10, variable resistance 102 is adjusted so that a 50,000 count output results to produce 2 pounds per count.

After the load signal has been manipulated by instrumentation amplifier 54, it is routed to an input of filter 56. The input of filter 56 couples through a resistor 106 to first nodes of a resistor 108 and a capacitor 110. Second nodes of resistor 108 and capacitor 110 couple to positive and negative signal inputs, respectively, of an op amp 112. The negative signal input of op amp 112 additionally couples to an output of op amp 112, and the positive signal input of op amp 112 additionally couples through a capacitor 114 to signal ground 98. Filter 58 is configured identically to filter 56. Thus, resistors 116 and 118, capacitors 120 and 124, and an op amp 122 couple together identically to resistors 106 and 108, capacitors 110 and 114, and op amp 112, respectively, as discussed above in connection with filter 56.

Filters 56 and 58 each provide substantially no gain or attenuation at low frequencies. However, filters 56 and 58 each provide a frequency response having two poles lower in frequency than the 13 Hz pole discussed above in connection with instrumentation amplifier 54. System 18 typically operates in an environment having particularly pervasive noise signals at one or more of 50 Hz, 60 Hz, or 400 Hz. The filtering provided by filters 56 and 58 in conjunction with the 13 Hz pole discussed above in connection with instrumentation amplifier 54 ensures that noise at these frequencies does not significantly influence the signal which is converted into a digital data value by A/D converter 60.

In the preferred embodiment A/D converter 60 provides a 16 bit resolution output signal. A quantization uncertainty parameter of any A/D converter is defined as being approximately $\pm\frac{1}{2}$ of a least significant bit (LSB) of the resolution of the A/D converter. For any 16 bit A/D converter, a $\frac{1}{2}$ LSB signal is approximately 102 dB attenuated relative to a full scale signal. Consequently, the preferred embodiment configures filters 56 and 58 to attenuate the 50 Hz and greater noise signals, which are particularly pervasive in the environments in which system 18 operates, by an amount which is significantly greater than this 102 dB level.

On the other hand, the filtering supplied by filters 56 and 58 is not so low in frequency that normal operation of system 18 is impaired. For example, the filtering supplied by filters 56 and 58 does not attenuate signals exhibiting a frequency of around 1/10 Hz or less. Consequently, the filtered load signal output from filter 58 responds sufficiently fast to changes in the load signal that a user of system 18 does not wait for system 18 to display a stable weight. In the preferred embodiment the frequency responses of filters 56 and 58 each exhibit two poles at around 1.125 Hz. Consequently, signals having a frequency of around 50 Hz are attenuated by greater than 130 dB through the filtering provided by instrumentation amplifier 54 and filters 56 and 58.

The output of filter 58 couples to an analog input of A/D converter 60, and a digital output of A/D converter 60 couples to a data input of UART 62. A serial transmission output of UART 62 couples to an input of buffer circuit 64, and an output of buffer circuit 64 couples to cable 14. Other signals from cable 14 couple to an input of a receiver 126, and an output of receiver 126 couples to a serial receive input of UART 62. A data ready output of UART 62 couples to a mode input of A/D converter 60. A clock circuit 128 has a first output which couples to a clock input of A/D converter 60 and a second output which couples to a clock input of UART 62.

In the preferred embodiment of the present invention, A/D converter 60 represents a successive approximation converter which utilizes a sequence of clock signals from clock circuit 128 to convert the filtered load signal output from filter 58 into a digital representation of the filtered load signal. The preferred embodiment uses an ICL 7104-16/ICL8065, two-chip A/D set, which is manufactured by the Intersil Company, for A/D converter 60. However, those skilled in the art will recognize that other 16-bit A/D converters may function similarly to A/D converter 60, described herein.

In addition, clock circuit 128 provides clock signals which are utilized by UART 62 to control the speed of serial data transmission into and out from LSU 10. In the preferred embodiment, UART 62 operates at 1200 baud, and buffer 64 and receiver 126 are configured for 20 ma current loop operation.

Furthermore, A/D converter 60 and UART 62 are configured to establish a handshaking protocol wherein a data transmission is received by UART 62 before UART 62 transmits data back to controller 12 (see FIG. 1). When a serial data transmission from controller 12 is received by UART 62, the data ready signal of UART 62 is supplied to the mode input of A/D converter 60, digital conversion data is transferred from A/D converter 60 to UART 62, and this conversion data is then transmitted serially through buffer 64 to controller 12. The baud rate, current loop operation, and handshaking protocol each tend to minimize the influence of noise on LSU 10 and the communication between LSU 10 and controller 12. The handshaking operation allows a minimum amount of communication to occur between LSU 10 and controller 12, and the communication operates as slowly as possible.

To briefly summarize features of LSU 10, the electrical circuitry and load cell of an LSU 10 physically reside together within a single housing. Consequently, the physical proximity of the electrical circuitry to strain gauges 50 minimizes noise influences. Moreover, the extensive filtering provided by the present invention further reduces the influence of noise. Analog signals are converted into digital signals, which are more immune to noise influences than are analog signals. In addition, by allowing fewer communications between LSU 1O and controller 12 than would be required if some of the filtering were performed in software at controller 12, noise influences are further reduced.

Still further, each LSU 10 is individually calibrated. Thus, each of LSUs 10a-10n (see FIG. 1) operates independently from the others. As a result, controller 12 couples to a plurality of LSUs 10a-10n, each of which may have a unique load range.

Another consequence of the individual calibration feature of LSUs 10 relates to system reliability. LSUs 10a-10n or cables 14a-14n connecting LSUs 10a-10n to controller 12 may fail. However, a failure in any one of these items in the present invention requires replacement of only a single LSU 10 or cable 14 rather than repair of an entire system 18. Consequently, system 18 obtains a significant improvement in reliability when a single spare LSU 10 and cable 14 are provided with system 18. If an LSU 10 or cable 14 experiences a failure, only the failed LSU 10 or cable 14 is replaced or repaired. System 18 remains operational by using the spare LSU 10 or cable 14 while a damaged LSU 10 or cable 14 is repaired.

Referring back to FIG. 1, microprocessor 20 executes programs which are stored in ROM 34 to accomplish the various functions performed by system 18. The flow chart diagrams of FIGS. 3-12 illustrate various programs in a simplified form. Generally speaking, these programs may be viewed as being partitioned so that system 18 operates in one of four different modes at any given time.

One of these four modes is a reset mode which is executed whenever power is initially applied to system 18. In this reset mode, microprocessor 20 executes a program which initializes various variables, clears display 36, and performs some minor self-testing routines. The tasks performed in the reset mode are relatively conventional in microprocessor based designs, and are not discussed further herein.

A second mode in which system 18 operates is the self-check mode. The self-check mode conducts an extensive test of the hardware of system 18. This extensive test may be more rigorous than the minor self-testing which is performed upon a reset. For example, such self-testing may, with operator interaction, test keyboard functions, it may conduct a rigorous and time consuming test of memory, and it may, with the attachment of an external test jig to controller 12, conduct various tests of the communication channels through which controller 12 communicates with LSUs 10a-10n. Such self-testing features are conventional in microprocessor based circuits, and are not discussed further herein.

The third and fourth modes in which system 18 operates are a foreground mode 200 and a keyboard service mode 300. Foreground mode 200 is illustrated in FIGS. 3-7. Foreground mode 200 includes the programs which microprocessor 20 executes when it has no cause to execute other programs. For example, after the reset mode has been executed, displays and variables require no further initialization. If microprocessor 20 has detected no request to perform a self-test and has detected no activation of a keypad 47a-47c on keyboard 46, then microprocessor 20 executes the programs of foreground mode 200.

Keyboard service mode 300 is illustrated in the flow charts of FIGS. 8-13. Keyboard service mode 300 is entered when microprocessor 20 detects the occurrence of an interrupt signal, which is supplied by circuits associated with keyboard 46. After completion of keyboard service mode 300, program control returns to foreground mode 200.

Figures 3, 4, 5:
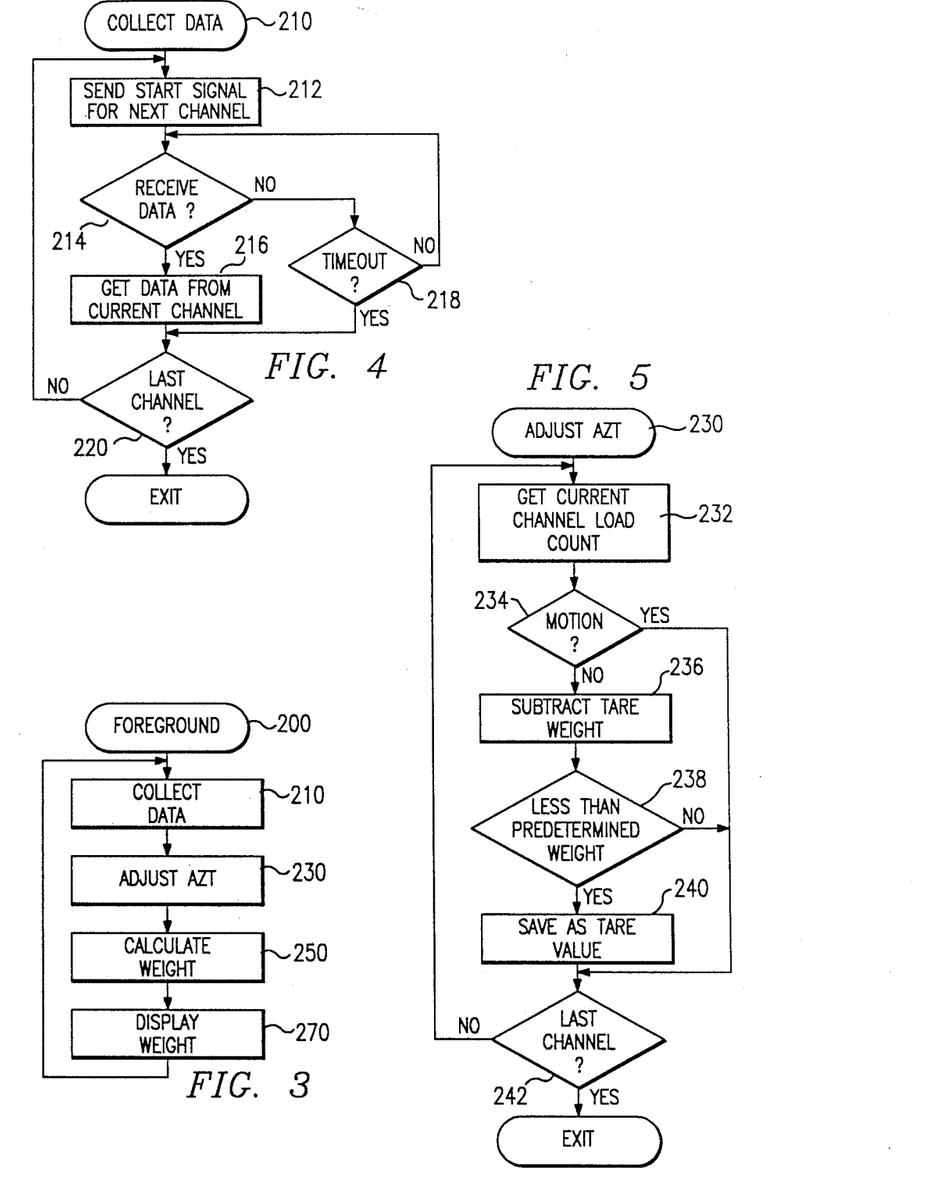
FIG. 3 shows a simplified flowchart of steps performed by a microprocessor in the preferred embodiment of the present invention when the microprocessor executes a program in a foreground mode.
FIG. 4 shows a simplified flowchart of a collect data routine shown in FIG. 3.
FIG. 5 shows a simplified flowchart of an adjust AZT routine shown in FIG. 3.

Referring to FIGS. 1 and 3, microprocessor 20 communicates with each of LSUs 10a-10n in a sequential fashion to obtain digital data from each of LSUs 10a-10n. After such data has been obtained from all of LSUs 10a-10n, the process calculates and displays weight for a selected channel, and then repeats continuously. In foreground mode 200 microprocessor 20 first performs a collect data routine 210. FIG. 4 shows tasks which collect data routine 210 utilizes to obtain a digital data value from each one of LSUs 10a-10n. As shown at a task 212, a start signal is first transmitted to a current channel (one of LSUs 10a-10n) with which microprocessor 20 is communicating. This start signal is sent after microprocessor 20 writes an appropriate data value to output bits P0-P2 of microprocessor 20 to control the operation of multiplexer 26 and de-multiplexer 24. Subsequently, a byte of data is transmitted at the serial output of microprocessor 20 to the particular one of LSUs 10a-10n.

After the start signal has been sent, a task 214 monitors the serial input of microprocessor 20 to detect the occurrence of data being returned to controller 12 from the particular one of LSUs 10a-10n with which microprocessor 20 is communicating. If microprocessor 20 detects the occurrence of such data, a task 216 is performed to obtain the transmission of data from the current channel. In the preferred embodiment, three bytes of data must be serially received at microprocessor 20 before transmission from the current one of LSUs 10a-10n is complete. After completion of this transmission, program control proceeds to a task 220.

When task 214 fails to detect a data transmission at the serial input of microprocessor 20, a task 218 tests a timer to see whether a predetermined period of time has expired. This timer may be one of the timers located internally to microprocessor 20, and it may have been initialized prior to the execution of task 214. So long as this time period has not expired, program control remains in a loop defined by tasks 214 and 218. However, when this time period expires, program control proceeds to task 220. Of course, collect data routine 210 may establish an error message or error code (not shown) which indicates the fact that no data was received.

In task 220 microprocessor 20 obtains a current channel number, which represents a variable that is stored in the memory of microprocessor 20. This current channel number variable represents a counter which keeps track of the one of LSUs 10a-10n with which microprocessor 20 is communicating at a given instant in time. In addition, during task 220 microprocessor 20 may update this variable and then save the updated variable in memory. Task 220 then tests this current channel number to determine whether all of LSUs 10a-10n have sent data to microprocessor 20. If not, task 220 routes program control back to task 212 to obtain data from the next channel. If the last channel is detected in task 220, program control exits routine 210.

Referring again to FIG. 3, after routine 210, program control proceeds to an automatic zeroing and tare adjustment routine 230. Adjust AZT routine 230 is described in more detail in FIG. 5. Generally speaking, the data previously obtained by routine 210 (see FIG. 4) represents a plurality of load counts wherein one load count is associated with each channel. Adjust AZT routine 230 selectively adjusts an auto-zero and tare value associated with each of the channels. Consequently, a first task 232 performed in routine 230 obtains a load count for a current channel number. A current channel number simply identifies a particular one of the channels, and the load count represents the data obtained in routine 210 from the specified channel.

After task 232, a task 234 examines this current channel load count to determine whether the corresponding load is in motion. Motion is detected by examining two successive load count values obtained from the same channel. Consequently, task 234 subtracts a previously obtained load count from the load count which was just obtained in the most recent execution of routine 210 (see FIG. 4). If this difference is within a predetermined limit, such as ±2 counts, then task 234 concludes that the load experienced at the current channel is not in motion. In this case, program control proceeds to a task 236. Task 236 subtracts a load count that corresponds to a tare weight from the load count obtained in task 232. The tare weight load count represents the weight of an empty container, or other object which may rest on an LSU 10a-10n and which is not part of the object being weighed. However, for the purposes of task 236, the tare weight is simply a variable which is set in accordance with the procedure discussed in connection with this routine 230 and with a procedure discussed below in connection with FIG. 11.

After task 236, a task 238 tests the digital value provided by task 236 to see whether or not its absolute magnitude is less than a predetermined value. In the preferred embodiment, this predetermined value is around three counts. Task 238 provides an automatic zeroing function for system 18. System 18 assumes that LSU's 10a-10n are not intended to measure weights less than those that correspond to the number of counts tested in task 238. Consequently, any measurements less than this predetermined count are assumed to be caused by drifts in the various components of system 18. Such drifting is particularly common immediately after system 18 has been activated until a stabilized temperature has been achieved.

If task 238 detects that the tested value is less than the predetermined number, then a task 240 saves the value as a new tare value for use in future calculations. Upon completion of task 240, or if task 238 detects a weight which is greater than this predetermined weight, or if task 234 detects that a load is in motion, program control proceeds to a task 242. Task 242 tests the current channel number previously used in task 232 to see whether or not it represents the last channel. If this current channel is not the last channel, then it is updated and program control proceeds back to task 232 so that the automatic zeroing and tare adjustment may be performed on the next channel. However, if the last channel is detected by task 242, then program control exits routine 230.

Referring back to FIG. 3, after routine 230 program control proceeds to a calculate weight routine 250. Calculate weight routine 250 is described in more detail in FIG. 6. Routine 250 generally takes a load count and converts it into a weight value after compensating for tare, latitude, and load cell range. Specifically, a task 252 of routine 250 gets a selected channel number, and then obtains load count data provided by routine 210 for the channel indicated by the selected channel number. The selected channel number is a variable stored in memory that indicates one of LSUs 10a-10n for which the weight is to be displayed. The setting of this selected channel number is discussed below in connection with FIG. 13.

Figure 6:
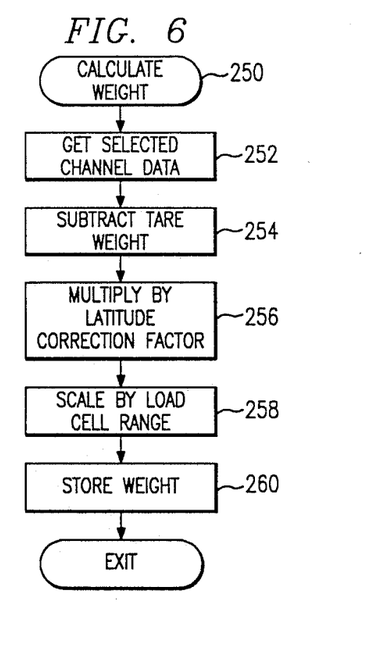
FIG. 6 shows a simplified flowchart of a calculate weight routine shown in FIG. 3.

After task 252, a task 254 subtracts the tare value from the load count obtained in task 252. This tare value may have been adjusted to provide an automatic zeroing function, as discussed above in connection with FIG. 5.

After task 254, calculate weight routine 250 next multiplies the data value generated in task 254 by a latitude correction factor in a task 256. The weight experienced by an object differs depending upon where on the surface of the earth an object is being weighted due to variance in gravitational attraction over the surface of the earth. This correction factor compensates for such gravitational variances. However, for the purposes of task 256, this correction factor merely represents a variable which is set in accordance with the routine discussed below in connection with FIG. 10.

Next, routine 250 takes the value from task 256 and scales it in a task 258 using a multiplication, division, or shift type of operation so that the resulting value is normalized regardless of a particular load range associated with the one of LSUs 10a-10n where the data value originated. A variable may be examined to determine the required scale factor. The setting of such variables is discussed below in connection with FIG. 12. Of course, those skilled in the art will recognize that the order of the above-mentioned compensating tasks need not occur precisely as described. After task 258, a task 260 simply saves this weight value.

Figure 7:
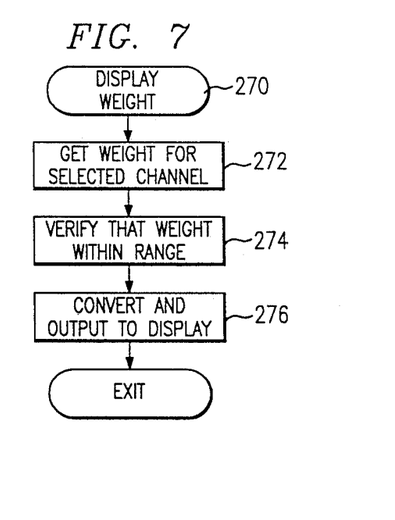
FIG. 7 shows a simplified flowchart of a display weight routine shown in FIG. 3.

Referring back to FIG. 3, after a weight has been calculated by routine 250, foreground mode 200 next performs a display weight routine 270. FIG. 7 illustrates display weight routine 270 in more detail. In routine 270 a task 272 obtains a weight value for the selected channel.

Task 260, discussed above in connection with FIG. 6, may have set this weight value which is obtained in task 272. Alternatively, this value may represent an error code which was set by other tasks, such as task 218 in FIG. 4. Next, a task 274 verifies that this weight is within the proper range. The weight value may indicate a weight which is beyond the load range of the selected one of LSUs 10a-10n. Alternatively, the selected channel may indentify an LSU 10a-10n which is not connected to controller 12. Consequently, task 274 may display an appropriate error message on display 36 (see FIG. 1) if the weight is not a proper weight value.

On the other hand, if the weight value appears to be proper, a task 276 converts this weight value to an appropriate code which, when output to display 36, causes the correct weight to be displayed. In addition, task 276 may output alphabetic characters to display 36 to indicate whether the weight represents pounds or kilograms. After completion of task 276, program control exits display weight routine 270.

Referring to FIG. 3, after completion of display weight routine 270, program control remains in foreground mode 200 within a loop consisting of routines 210, 230, 250 and 270 until some event occurs which causes program control to exit foreground mode 200. As discussed above, an interrupt presented to microprocessor 20 from circuits associated with keyboard 46 represents one event which causes program control to exit foreground mode 200 and enter keyboard service mode 300, shown in FIG. 8.

Figure 8:
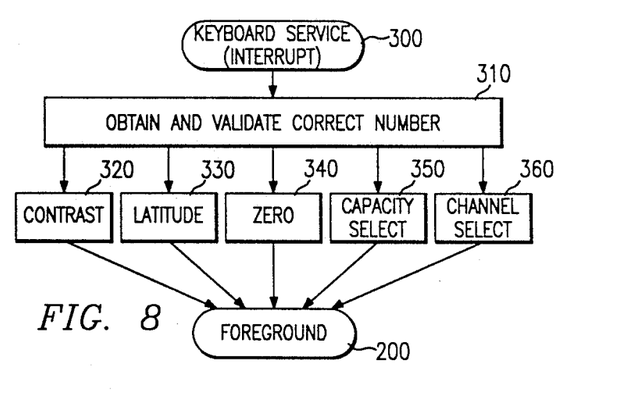
FIG. 8 shows a simplified flowchart of steps performed by the microprocessor in the preferred embodiment of the present invention when the microprocessor executes a program in a keyboard service mode.

As soon as program control enters keyboard service mode 300, microprocessor 20 executes a task 310, which obtains and validates a keypad number. As discussed above in connection with FIG. 1, keypad identifying data may be obtained by performing a read operation from buffer 48. This data may then be converted, using a look up table, into a particular keypad number. Moreover, task 310 may advantageously perform a debouncing function and check to see that an obtained keypad number represents a valid keypad number.

Keyboard 46 is utilized by a user of system 18 to enter data into controller 12. This data may be utilized by various system 18 functions. An appropriate sequence for entering data would be to first depress a function keypad 47b, then a numeric keypad 47a, and finally a control keypad 47c. Consequently, task 310 additionally tests to see if a proper sequence is being entered. For example, an initial depression of a numeric keypad 47a or control keypad 47c would provide an invalid switch number. Once a valid switch number has been obtained, program control proceeds to one of five routines selected in accordance with the keypad number.

Contrast routine 320 represents a first one of these routines. Contrast routine 320 is described in more detail in FIG. 9. A task 322 in contrast routine 320 obtains a contrast variable from memory. This contrast variable equals a contrast value previously written into latch 38 (see FIG. 1). Next, task 322 either increments or decrements this contrast value and restores the updated contrast value back to memory. If task 322 has not been previously performed within a predetermined period of time, then task 322 increments this contrast value. However, if task 322 has been previously performed within the predetermined period of time, then this contrast value is decremented. After task 322, a task 324 outputs the contrast value increment ⓡd or decremented by task 322 to latch 38, and the contrast of display 36 is adjusted as discussed above in connection with FIG. 1. After task 324, program control exits contrast routine 320 and returns to foreground mode 200.

Figure 9:
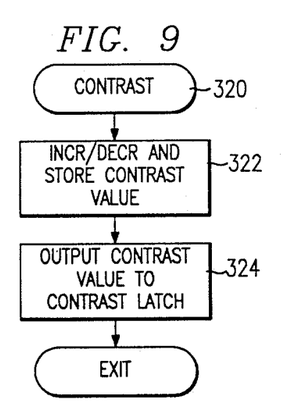
FIG. 9 shows a simplified flowchart of a contrast routine shown in FIG. 8.

Thus, a user of system 18 may depress the contrast adjust keypad to cause display 36 to become darker. However, if a user wishes display 36 to become lighter, the user releases the contrast adjust keypad and redepresses the contrast adjust keypad within a short period of time. So long as a user continually depresses the contrast adjust keypad, after program control has been returned to foreground mode 200, a subsequent interrupt will again cause program control to be returned to contrast routine 320. Of course, contrast routine 320 may additionally include checking to determine when maximum and minimum contrast values have been reached and prevent further incrementing or decrementing beyond these values.

A second routine to which program control may be transferred when a valid keypad number has been obtained in task 310 is latitude routine 330. Latitude routine 330 is described in more detail in FIG. 10. Within latitude routine 330, a task 332 obtains a valid latitude value from keyboard 46. Task 332 may include several sub-steps. For example, task 332 may first output a display message to display 36 to communicate a current latitude value saved in memory to a user of system 18. Then, a prompt display message may be displayed on display 36 to inform the user of the type of data the user should input at keyboard 46. Next, task 332 may establish a timer so that program control may continue even though a user fails to enter the data which display 36 is prompting the user to enter. Next, as the user enters data, task 332 waits until the user indicates the completion of data entry. For example, a latitude number may require two digits to describe. Thus, in this situation microprocessor 20 must individually receive the two digits from keyboard 46 before the latitude entry is complete. The user may depress the control keypad 47c labeled "enter" to communicate the completion of the numeral entering sequence.

Figure 10:
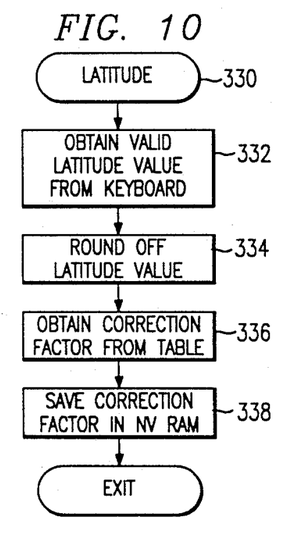
FIG. 10 shows a simplified flowchart of a latitude routine shown in FIG. 8.

Alternatively, the user may depress the control keypad 47c labeled "clear" to inform task 332 that previously entered numbers were in error and that the user wishes to enter a different number. If the "clear" keypad is depressed before numerals have been entered, then task 332 may interpret this situation as an instruction to switch program control away from latitude routine 330 altogether. After a number has been entered, task 332 may check the just-entered number to verify that it represents a valid latitude. For example, a latitude of greater than 90° may represent an improper latitude. When an improper number has been entered, task 332 may prompt the user to enter a different latitude number. Only after a valid latitude value has been obtained from keyboard 46, will program control proceed to a task 334.

In the preferred embodiment, task 334 rounds the latitude value obtained from task 332 to a closest integer multiple of 5°. Next, a task 336 utilizes the rounded-off latitude value as a lookup table index to obtain a correction factor. The correction factor represents a number from 0.9974, which is associated with a latitude of 90°, to 1.0027, which is associated the latitude of 0°. A correction factor of 1.0000 is associated with a latitude of 45°.

After task 336, a task 338 saves the correction factor obtained from task 336 in nonvolatile RAM 32 and returns program control to foreground mode 200. Since this latitude data value is saved in nonvolatile RAM, it remains valid until a user changes it, regardless of whether or not system 18 is powered down after execution of latitude routine 330. As discussed above in connection with task 256 in FIG. 6, this latitude value is utilized in calculating a weight value.

Referring back to FIG. 8, when task 310 detects an activation of valid keypad corresponding to the "zero" function keypad 47b of keyboard 46, program control is transferred to a zero routine 340. Zero routine 340 is described in more detail in FIG. 11. The zero function works upon the selected channel, discussed above. Upon entry of program control to zero routine 340, a task 342 obtains a most recent load count for the selected channel. The load count represents the data previously obtained in routine 210 and stored in memory.

Figure 11:
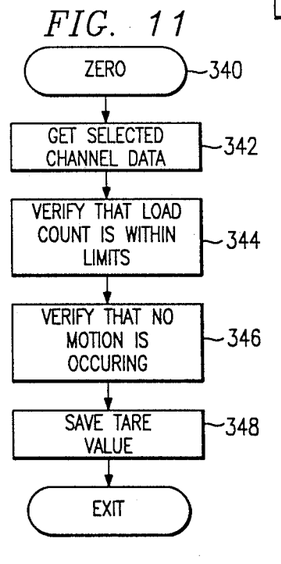
FIG. 11 shows a simplified flowchart of a zero routine shown in FIG. 8.

Next, a task 344 verifies that this load count is within tare limits. The preferred embodiment establishes tare limits at around ±3,000 counts. Thus, an error message will be displayed if the user of system 18 attempts to tare-out a weight which produces more than ±3,000 counts. This generally corresponds to 3000 lbs with a 50,000 lb LSU 10 or 1500 lbs with a 25,000 lb LSU 10. After task 344, a task 346, verifies that the load on the selected channel is not in motion. Thus, task 344 is similar to task 234 discussed above in connection with FIG. 5. Of course, if task 346 detects motion, an appropriate error message may be displayed and program control may exit routine 340 without adjusting tare values. Then, a task 348 saves the valid tare value from task 342 in memory. Consequently, zero routine 340 sets the tare values that tasks 236 in FIG. 5 and 254 in FIG. 6 utilize. After completion of task 348, program control exits zero routine 340 and returns to foreground mode 200.

When task 310 obtains a valid keypad number that corresponds to the "capacity select" function keypad 47b of keyboard 46, program control transfers to capacity select routine 350, as shown in FIG. 8. Capacity select routine 350 is described in more detail in FIG. 12. Routine 350 operates in conjunction with the selected channel, discussed above. Consequently, routine 350 first obtains a valid capacity or load range value for the selected channel. Task 352 closely resembles task 322 discussed above in connection with FIG. 10. Consequently, messages may be displayed on display 36, editing functions are permitted, and testing is performed on a number which a user enters to verify that this number represents a valid load range.

Figure 12:
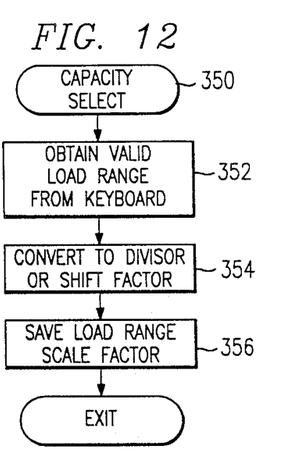
FIG. 12 shows a simplified flowchart of a capacity routine shown in FIG. 8.

After task 352, a task 354 converts the valid load range value from task 352 into a specific scale factor which is utilized by task 258, discussed above in connection with FIG. 6. The conversion may be performed through a table lookup operation. In the preferred embodiment, this scale factor represents a shift factor. Consequently, a scale factor of zero used in connection with a 50,000 lb load cell communicates to task 258 that no left or right shift operations are to be performed. After task 354, a task 356 saves the load range scale factor produced by task 354 and exits capacity select routine 350 to foreground mode 200.

Figure 13:
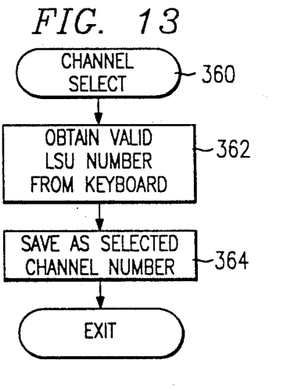
FIG. 13 shows a simplified flowchart of a channel select routine shown in FIG. 8.

When task 310 obtains a valid keypad number which corresponds to the "channel select" function keypad 47b on keyboard 46, program control transfers to a channel select routine 360, as shown in FIG. 8. FIG. 13 illustrates channel select routine 360 in more detail. Upon entry of program control to channel select routine 360, a task 362 obtains a valid LSU number from keyboard 46. Task 362 closely resembles task 332 discussed above in connection with FIG. 10. Thus, prompts are displayed at display 36, editing functions are permitted, and testing is performed on numbers input at keyboard 46. When a valid LSU number has been obtained in task 362, a task 364 saves this LSU number as the selected channel variable. The selected channel number represents the variable which was discussed above in connection with FIGS. 6, 7, 11, and 12. Upon completion of task 364, program control exits channel select routine 360 to foreground mode 200.

In summary, the many correction factors, scale factors and offset factors discussed above all combine to provide an extremely accurate weight measurement. Moreover, many calculations and conversions are performed in software in the present invention so that a user of the present invention need not perform such calculations and conversions manually and risk the introduction of errors. Still further, the present invention represents an extremely flexible weighing system because it can accommodate load sensing units having a variety of different load ranges. As discussed above, many system architecture and hardware design features tend to minimize noise influences to permit accurate and repeatable weight measurements.

The foregoing description discusses preferred embodiments of the present invention which may be changed or modified without departing from the scope of the present invention. For example, many of the particular hardware and software features discussed herein may be modified without altering the basic scope of the present invention. In addition, those skilled in the art will recognize that specific software routines which perform the functions discussed above may be coded using many different computer programs Moreover, such computer programs should be tailored to accommodate specific microprocessors and specific hardware architectures, each of which may also be modified by those skilled in the art. Consequently, the softWare and the hardware are subject to numerous changes and modifications without departing from the scope of the present invention.

What is claimed is:

1. A system for measuring weight of a load comprising:
   a plurality of load sensing units, each including:
   a load cell operable in only one of a plurality of load ranges,
   a differential amplifier coupled to said load cell, configured to have a variable gain for calibrating said load sensing unit, and configured so that a full scale common mode input signal to said amplifier is attenuated by said amplifier to an amplitude less than said quantizing uncertainty parameter,
   a filter coupled to said amplifier and configured to attenuate full scale signals at 50 Hz and greater to an amplitude which is less than said quantizing uncertainty parameter, and
   an analog-to-digital converter coupled to said filter and having said quantizing uncertainty parameter associated therewith, said converter being for supplying a digital load data value; and a controller remotely located from each of said load sensing units, said controller including:
   computing means coupled to each of said converters in said plurality of load sensing units,
   means for receiving information identifying said one of a plurality of load ranges for each said load sensing units and identifying a latitude at which the load is being measured, and for supplying a load range data value for each of said load sensing units and a latitude data value to said computing means, and
   means for displaying weights calculated by said computing means, and
   memory means for storing a program executable by said computing means, said memory means being configured so that when said computing means executes said program, said computing means calculates and displays weight experienced by one of said plurality of load sensing units using one of said digital load data values, one of said load range data values, and said latitude data value.

2. A system as claimed in claim 1 wherein:
   said controller receiving means additionally receives information identifying a load at one of said plurality of load sensing units as being a tare weight and additionally supplies a tare identification value to said computing means; and
   said controller memory means is additionally configured so that when said computing means executes said program, said computing means calculates weight additionally using a tare weight value calculated in response to said tare identification value.

3. A system as claimed in claim 2 wherein said controller memory means is additionally configured so that said computing means monitors said digital load data values and if said digital load data values are less than a predetermined value, displays weight as being zero and saves automatic zero data values corresponding to said digital load data values which are less than said predetermined value to operate as an offset to weights calculated using digital load data values greater than said predetermined value.

* * * * *

UNITED STATES PATENT AND TRADEMARK OFFICE
CERTIFICATE OF CORRECTION

PATENT NO. : 4,967,384

DATED : October 30, 1990

INVENTOR(S) : Tommy B. Molinar et al.

It is certified that error appears in the above-indentified patent and that said Letters Patent is hereby corrected as shown below:

In Column 6, lines 6&7, delete "sufficntily" and insert therefor -- sufficiently --.

In Column 6, lines 7&8, delete "insignificent" and insert therefor -- insignificant --.

In Column 6, line 15, delete "additionallY" and insert therefor -- additionally --.

In Column 8, line 47, delete "1O" and insert therefor -- 10 --.

In Column 12, line 5, delete "0f" and insert therefor -- Of --.

UNITED STATES PATENT AND TRADEMARK OFFICE
CERTIFICATE OF CORRECTION

PATENT NO.   : 4,967,384
DATED        : October 30, 1990
INVENTOR(S)  : Tommy B. Molinar et al.

It is certified that error appears in the above-indentified patent and that said Letters Patent is hereby corrected as shown below:

In Column 13, line 14, delete "increment R d" and insert therefor -- incremented --.

In Column 15, line 50, insert therefor --.-- between "programs" and "Moreover,".

In Column 15, line 54, delete "softWare" and insert therefor -- software --.

In Claim 1, Column 16, line 9, delete "said" and insert therefor -- a --.

Signed and Sealed this

Twenty-fourth Day of August, 1993

Attest:

BRUCE LEHMAN

Attesting Officer

Commissioner of Patents and Trademarks